United States Patent [19]

Lee

[11] 4,009,797
[45] Mar. 1, 1977

[54] WALL PLATE FOR ELECTRICAL SWITCHES, ELECTRICAL OUTLETS AND THE LIKE

[75] Inventor: Martin Lee, Yonkers, N.Y.
[73] Assignee: American Tack & Hardware Co., Inc., Monsey, N.Y.
[22] Filed: July 22, 1976
[21] Appl. No.: 707,602
[52] U.S. Cl. .............................. 220/242; 174/67; 220/3.8
[51] Int. Cl.$^2$ ........................................ H02G 3/14
[58] Field of Search ............... 220/241, 242, 3.8; 174/66, 67; 339/44 R, 40

[56] References Cited
UNITED STATES PATENTS

| | | | |
|---|---|---|---|
| 2,980,283 | 4/1961 | Bentsen | 220/241 |
| 3,042,739 | 7/1962 | Craig | 220/242 X |
| 3,544,703 | 12/1970 | Jones | 174/66 |

Primary Examiner—George T. Hall
Attorney, Agent, or Firm—Gottlieb, Rackman, Reisman & Kirsch

[57] ABSTRACT

A wall plate, for electrical switches, electrical outlets and the like, includes a frame and an insert received by the frame. The frame is held against the wall by the insert, which is secured to the electrical switch or electrical outlet by at least one fastening element which fits through an aperture defined in the insert. The insert includes at least one flange which serves as an abutment or stop to prevent damage to the insert as the fastening element is tightened and the insert is pulled toward the switch or outlet.

10 Claims, 6 Drawing Figures

U.S. Patent  Mar. 1, 1977  Sheet 1 of 2  4,009,797
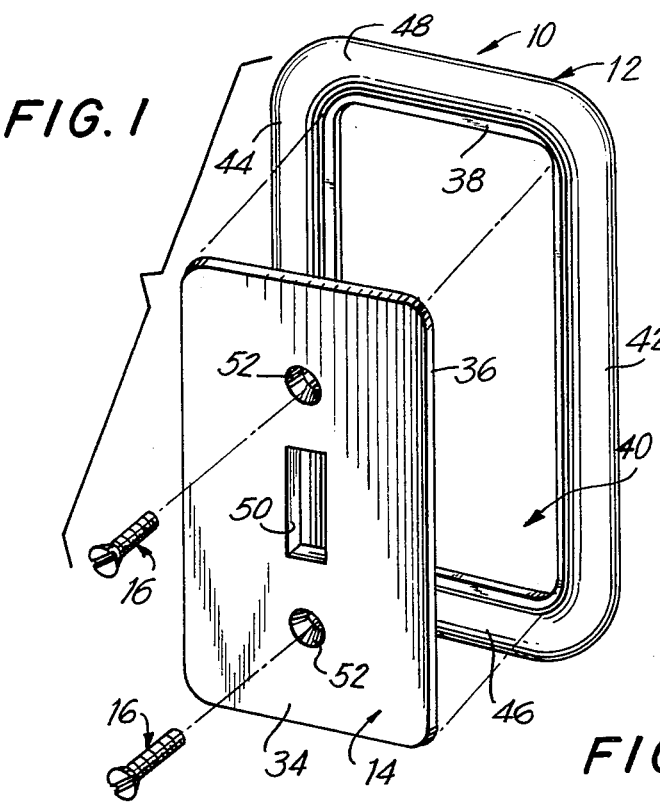
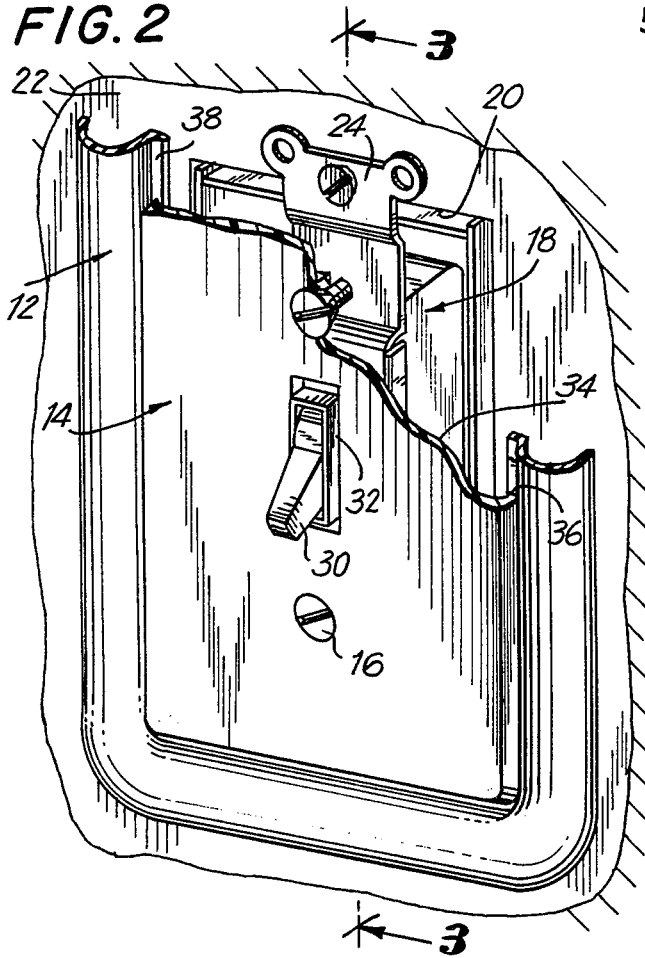
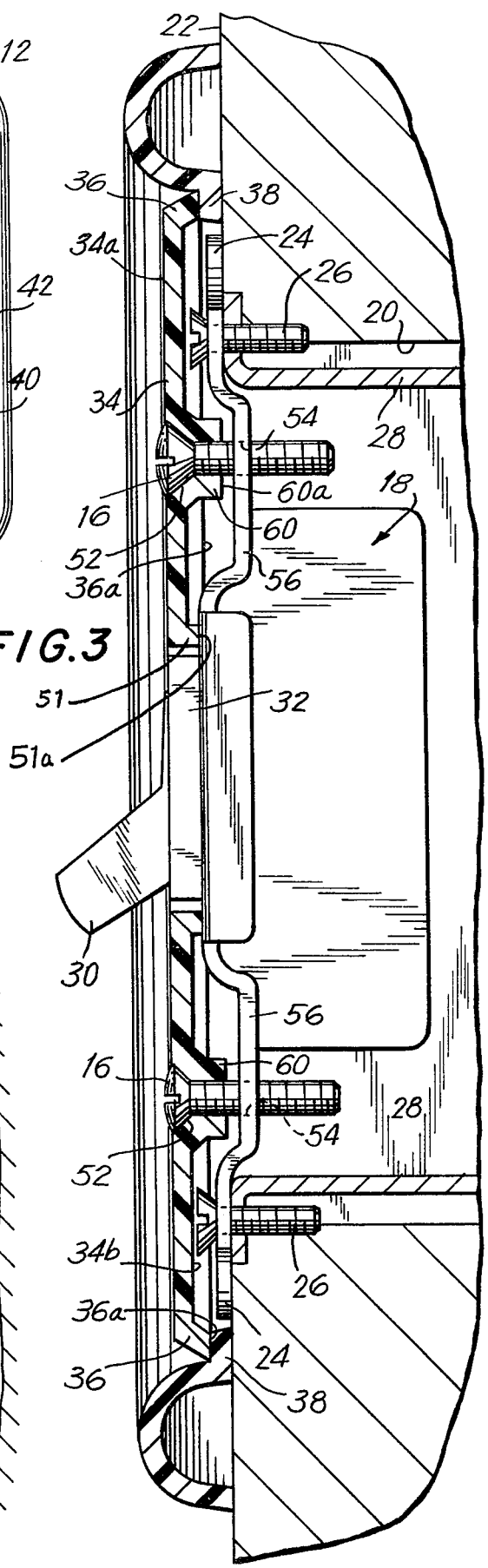

WALL PLATE FOR ELECTRICAL SWITCHES, ELECTRICAL OUTLETS AND THE LIKE

This invention is directed to wall plates for various electrical apparatus and, more particularly, to a wall plate for electrical switches, electrical outlets and the like, comprising a frame and a removable insert therefor.

Conventional wall plates for electrical switches, electrical outlets and the like, are well-known in the art. Most wall plates are usually formed of a single, substantially flat plate which is connected to the electrical switch or electrical outlet by appropriate fastening elements; for example, by one or more screws which pass through appropriate apertures defined in the plate and which are threaded into an opening defined in the electrical switch or electrical outlet. As a general rule, such wall plates are installed at the same time as the electrical switch or electrical outlet, and the wall plates tend to be rather unsightly in appearance, since they are usually formed of brown or black plastic.

Over the years, there have been numerous attempts to provide wall plates for electrical switches or electrical outlets which are more decorative than the rather utilitarian wall plates described above. To this end, it has been proposed to have wall plates which include a decorative insert which is secured to the electrical switch or electrical outlet and which fits within an insert-receiving frame. One example of such a wall plate is shown in U.S. Pat. No. 2,980,283 which issued to Arthur R. Bentsen on Apr. 19, 1961. The Bentsen patent discloses various decorative, flat and bendable inserts, which are received by a curved wall plate frame, with the insert resting against a recessed ledge formed in the frame.

Although the wall plate disclosed in the Bentsen patent is an improvement over the more utilitarian wall plates discussed above, from a standpoint of aesthetics and decorative purposes, wall plates of the type disclosed in the Bentsen patent have been less than satisfactory in terms of ease of installation. Specifically, it has been found that when the insert is secured to the electrical switch or electrical outlet, there exists the tendency of the person installing the wall plate to continue tightening the screw or screws which secure the insert to the outlet or switch. Since inserts of this type are usually formed of plastic or similar material, too much tightening of the screws tends to break or otherwise damage the insert. In fact, there is the same tendency to damage any wall plate formed of plastic or similar material, if the fastening screws holding the wall plate in place are tightened too severely.

Accordingly, it is a broad aspect of the present invention to provide a wall plate for an electrical switch or an electrical outlet or the like, which not only covers the switch or the outlet, but which also provides a pleasing and decorative appearance.

Another object of the invention is to provide a wall plate for an electrical switch or an electrical outlet or the like, which is easy to install.

Yet another object of the invention is to provide a wall plate for an electrical switch or an electrical outlet or the like, which is not damaged as the wall plate is secured to the switch or outlet.

A further object of the present invention is to provide a wall plate for an electrical switch or an electrical outlet or the like, which may be manufactured economically.

A still further object of the present invention is to provide a wall plate for an electrical switch or an electrical outlet or the like, which overcomes the difficulties of wall plates fabricated according to the prior art.

These and other objects of the present invention are attained by provideing a wall plate for electrical switches, electrical outlets and the like comprising a frame, and a plastic, decorative insert received within the frame. The frame defines a flat insert-receiving ledge which receives a first peripheral flange member of the wall plate insert. The insert includes at least one aperture which receives a fastening element, such as a screw. The screw passes through the aperture and is threaded into an opening in the electrical switch or outlet to secure the insert to the electrical member. A second flange member is disposed about the aperture, projects further toward the electrical switch or outlet than the first flange member, and acts as a stop or abutment which prevents the insert from being damaged as the screw is tightened and the insert pulled toward the switch or outlet.

The above brief discription of the present invention, as well as further objects, features and advantages thereof, will become more readily apparent upon consideration of the following detailed description of preferred, but nonetheless illustrative embodiments, when taken in conjunction with the following drawings, wherein:

FIG. 1 is a front perspective view of a wall plate according to one embodiment of the present invention, showing the various elements thereof in an exploded condition, with the insert of the type adapted to be secured to a single electrical switch;

FIG. 2 is a front perspective view of a wall plate according to the embodiment of FIG. 1, with the insert and frame partially broken away and showing the wall plate secured to the single electrical switch;

FIG. 3 is a sectional view, taken along the line 3—3 of FIG. 2, and enlarged in scale;

Figure 4:
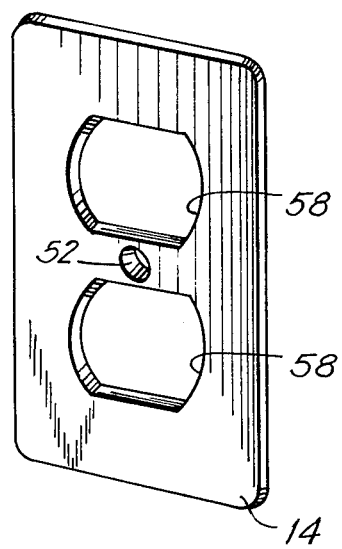
FIG. 4 is a perspective view of an insert for a wall plate according to a second embodiment of the present invention, with the insert of the type to be secured to an electrical outlet having two outlet "plugs"

Referring now to the drawings and more particularly to FIGS. 1–3 thereof, a wall plate for an electrical switch according to one embodiment of the present invention is generally designated 10. The wall plate includes a frame, generally designated 12, and an insert, generally designated 14. Appropriate fastening elements in the form of screws generally designated 16, are also provided, with the fastening elements functioning, as explained hereinafter, to attach the insert to an electrical apparatus.

In the first illustrative embodiment shown in FIGS. 1–3 of the drawings the frame 12 and insert 14 of the wall plate are adapted to fit over and substantially cover a conventional electrical "single" toggle switch, generally designated 18. However, and as will become more apparent hereinafter by reference to the other embodiments of FIGS. 4–6, the frame and insert may be formed so that the wall plate can be used with different types of electrical apparatus; for example, single (i.e., two-plug) electrical outlets, double toggle switches, double (i.e., four-plug) electrical outlets, etc.

The electrical switch 18 is of conventional design and is adapted to fit within an appropriate recess 20 defined in a wall or other mounting surface 22. Switch 18 is mounted in recess 20 by mounting ears 24 and by fastening screws 26 which attach the electrical switch to mounting members or supports 28. As is conventional, the electrical switch 18 includes an on-off member, in the form of a toggle switch 30, which projects outwardly from wall 22, and which is movable back and forth, within a toggle switch guide 32, which also projects outwardly from wall 22.

As indicated previously, it is most common for the electrical switch 18 (or electrical outlet) to be covered by a single element, substantially flat wall plate, with the wall plate being attached to the switch (or outlet) when the switch (or outlet) is installed. Wall plates of conventional design are not very appealing, from a decorative standpoint, since they are usually brown or black and since they seldom have any decorative relation to the wall or mounting surface which surrounds the plate. Similarly, although wall plates having removable inserts have been disclosed in the prior art, these removable inserts are difficult to attach and are prone to damage if they are secured too tightly to the electrical switch or outlet.

In order to overcome these disadvantages, the wall plate 10 of the present invention includes an insert 14 having a front wall 34 defined by a front face 34a and a back face 34b. The front face 34a may have a decorative design or pattern, for example, it may be colored or have any design thereon, so that the insert is "decorative" and compatible with the mounting surface or wall 22.

The insert 14 also includes a first flange 36 which extends around the periphery of front wall 34 and which flares slightly outwardly from the front wall of the insert, i.e., away from back face 34b and toward switch 18. The insert 14 is received within frame 12, with the first flange 36 of the insert being seated on a substantially flat insert-receiving ledge 38 formed on the frame. The insert-receiving ledge 38 is directed inwardly, i.e., toward the frame opening 40. The frame also includes parallel frame arms 42 and 44 and somewhat shorter and parallel frame arms 46 and 48. The four frame arms define the frame and, in the embodiments illustrated in the drawings, are arcuate in cross-section so that the frame has a pleasing, modern and rounded appearance. The ledge 38 of the frame and the first flange 36 of the insert cooperate such that the insert is held within the frame arms. Frame 12 is held against wall 22 by insert 14 which is fastened to electrical switch 18 and, specifically, by the force of flange 36 against ledge 38, which results when the insert 14 is secured to the electrical switch.

The insert defines an electrical apparatus receiving opening in the form of a toggle switch receiving opening 50, of rectangular shape, which receives the toggle switch 30 and toggle switch guide 32 of the switch 18, enabling the toggle switch 30 to be operated by a user to turn the electrical switch on and off. The apparatus receiving opening includes a peripheral apparatus receiving flange 51 (see FIG. 3), which extends around the receiving opening 50 and which is directed toward the electrical switch or outlet.

As indicated previously, insert 14 is secured to the electrical switch 18 by fastening elements, such as screws 16, which pass through appropriate apertures 52 defined in the insert. The apertures may be bevelled in shape, i.e., "counter-sunk", as illustrated in FIG. 3, so that the head of screw 16 does not pass through the aperture but remains substantially flush with front face 34a. Obviously, the aperture may be cylindrical in cross-section, in which case the head of the screw will project out from the insert. The screws 16 threadably engage the electrical switch 18 which is formed to include conventional screw-receiving apertures 54, which are defined in the front face 56 of the electrical switch.

In the embodiment illustrated in FIGS. 1–3 of the drawings, the insert 14 is shown as having two apertures 52 for receiving two fastening elements, such as screws 16, and a single apparatus receiving opening 50 which allows for operation of electrical switch 18. The screws are received by the two apertures 54 of the electrical switch 18, with apertures 52 and 54 being in alignment with each other. Thus, insert 14 is fabricated to include two screw apertures 52, since the electrical switch 18 conventionally receives two fastening screws 16. However, it should be appreciated that the number of apertures 52 defined in the insert, as well as the shape and number of the apparatus receiving openings, will usually be a function of the particular electrical apparatus that the wall plate is designed to cover.

For example, if the wall plate is to cover a conventional single electrical outlet, of the type having two plugs, then insert 14 would define two plug-receiving openings 58, and but a single aperture 52, disposed between the two plug-receiving openings, as shown in FIG. 4. Thus, in the embodiment of FIG. 4, the aperture 52 is adapted to receive a single fastening element which functions to secure the insert 14 to a conventional electrical outlet (not shown) mounted on the interior of a wall or similar surface.

Figure 5:
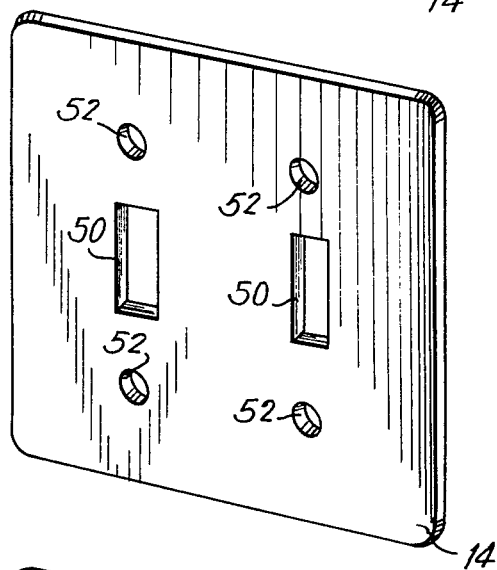
FIG. 5 is a perspective view of an insert for a wall plate according to a third embodiment of the present invention, with the insert of the type adapted to be secured to a double electrical switch.
Figure 6:
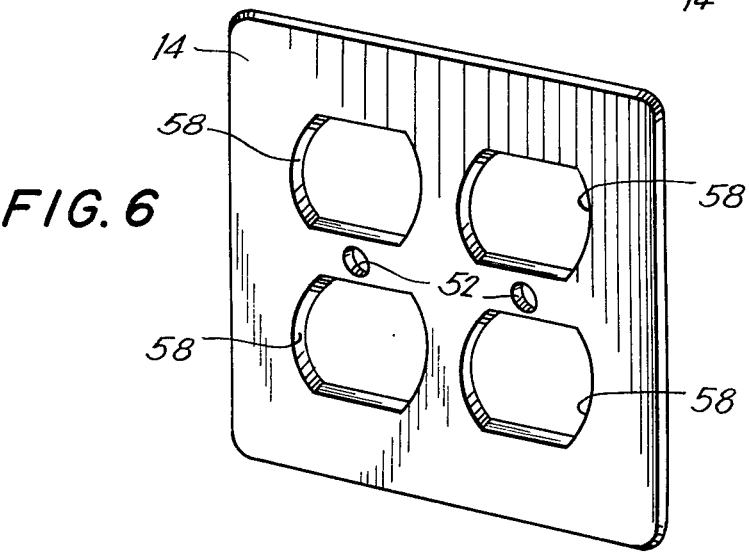
FIG. 6 is a perspective view of an insert for a wall plate according to a fourth embodiment of the present invention, with the insert adapted to be secured to a double (four-plug) electrical outlet.

Similarly, and as shown in the embodiments of FIGS. 5 and 6, the insert (and corresponding frame) may be designed to be compatible with multiple electrical switches (i.e., the embodiment of FIG. 5), or multiple electrical outlets (i.e., the embodiment of FIG. 6).

In the embodiment of FIG. 5, where the insert is designed to be compatible with a double electrical switch, the insert defines two apparatus receiving openings 50 and four screw apertures 52. Similarly, in the embodiment of FIG. 6, where the insert is designed to be compatible with a four-plug outlet, the insert defines four apparatus receiving openings 58 and two screw apertures 52.

Whatever type of insert 14 is used, and as explained before, it is important, when the fastening element or elements 16 are tightened to secure the insert to the particular electrical switch or electrical outlet, that the insert is not cracked or otherwise damaged from tightening the fastening elements too much. On the one hand, the fastening element 16 must be tightened sufficiently so that the insert 14 holds the frame 12 in place against the wall. On the other hand, it should not be tightened to such an extent as would damage the insert. This is a problem which exists with all wall plates formed of plastic, but it is particularly a problem when dealing with plastic inserts of the type which fit within a frame since, by their very nature, the inserts tend to be somewhat delicate and since they are held away from the wall by the surrounding frame. This increases the tendency for the fastening elements to be overtightened, due to the "give" of the insert.

In order to remedy this problem, each aperture 52 defined in the insert 14 of the present invention is formed to define a second flange 60, which surrounds the aperture and which projects away from the back face 34b of insert 14 and toward the electrical switch 18 or other electrical apparatus that the wall plate is designed to cover. The second flange 60 acts as an abutment or stop, with the back face 60a of the flange hitting the front face 56 of the electrical switch as fastening element 16 is tightened. In other words, should screw 16 be tightened more than indicated in FIG. 3, the insert 14 will be flexed and pulled toward the electrical switch 18. Although not necessary, the screw can be tightned until the back face 60a of the second flange hits the face 56 of the switch. When this occurs, the person installing the insert will know that the screw 16 has been tightened all that it should be, and further tightening of the screw can only damage the insert.

It should be appreciated that it is not necessary, in securing the insert 14 to the electrical switch 18 (or other type of electrical apparatus), for the screw 16 to be tightened until the back face 60a of the flange hits the electrical switch or outlet. By way of example, the insert 14 can be designed so that there usually exists a clearance or space between the back face 60a of the insert and the face 56 of the electrical switch or outlet of from 0.01 to 0.075 inches, depending upon the contour of the electrical switch 18 (or outlet), with such clearance varying from manufacturer to manufacturer. The important consideration is that the second flange is usually sized such that the back face 60a projects more toward the electrical switch (or outlet) than the rear face 36a of first flange 36, i.e., the back face 60a of the second flange projects further away from back face 34b of the insert and more toward the electrical switch or outlet than the rear face 36a of the first flange 36. The second flange 60 should thus extend toward the electrical switch or outlet sufficiently such that the back face 60a of the flange will contact the front face 56 of the electrical switch, before the screws are tightened to an extent which would damage the insert.

It should also be noted that the second flange is located behind and around aperture 52. This is because this is the point of maximum pull or bending of the insert caused by the action of screw 16 as this fastening element is tightened. Yet another advantage in locating the second flange there is that this enables the interior of the flange to act as a guide for the screw in directing the screw toward the corresponding opening in the outlet or switch.

The insert is also properly located relative to the electrical apparatus, once the insert has been attached to the apparatus via screws 16, by the apparatus receiving flange 51 which projects from the apparatus receiving opening 50. Thus, the back face 51a of this flange makes contact with the face of the switch or outlet thereby assisting in locating the distance of the insert from the electrical apparatus.

It will be appreciated, therefore, that there has been disclosed a wall plate for electrical switches, electrical outlets and the like having a decorative insert which may be readily and easily attached to the particular apparatus for which the wall plate is intended to cover. It is anticipated that wall plates according to the present invention may be purchased, at the retail level, in hardware stoes and other establishments where the wall plates may be displayed for purchase by the ultimate consumer. A plurality of wall plates will be available, with various inserts and frames therefor, with the inserts and frames varying in design, both aesthetically and in relation to the particular type of apparatus, i.e., single or double electrical switch or outlet, etc., which is to be covered by the wall plate. Whatever the physical configuration of the insert, i.e., adapted to fit over either a switch or an outlet, and whatever its decorative appearance, i.e., color-coordinated with the frame and/or mounting surface, it will be appreciated that the insert is not prone to damage as the insert is secured to the electrical apparatus, as a result of the particular configuration of the insert and, in particular, the second flange which prevents the fastening screws from being tightened to an extent where the insert is cracked or otherwise broken. Yet another advantage of the second flange is that it directs the screw toward the aperture in the electrical apparatus. This is because the interior of the second flange 60 helps align the screw and the opening of the electrical apparatus. Thus, the wall plate may be installed quickly and easily.

It will be further appreciated that all three sets of flanges, that is, the first flange 36, the apparatus receiving flange 51 and the second flange 60 cooperate in locating the insert relative to the frame and electrical switch or outlet. Thus, as the insert is tightened to the electrical apparatus, flange 36 first makes contact with frame 12. Further tightening of the screws causes contact to be made between flange 51 and the electrical apparatus around the apparatus receiving opening 50, thereby controlling the overall distance between the apparatus and insert. Still further tightening causes flange 60 to abut the apparatus, limiting any further movement of the insert toward the outlet or switch.

Obviously, numerous modifications may be made in the embodiments described above, without departing from the principles of the present invention. For example, the configuration of the frame 12 may be changed, so that the wall plate, rather than having a sleek and modern appearance, can be made to look more traditional. Similarly, although it is advantageous to form the insert of a plastic material, from a standpoint of cost, weight and the like, it should also be clear that insert 14 and frame 12 may be fabricated of other materials, if so desired. Still further, although the second flange has been shown as being continuous and surrounding the screw aperture in the insert, it should be noted that other flange configurations, i.e., two separated and distinct semi-circles about the aperture, etc., may be utilized.

It should be understood, therefore, that the preferred embodiments are merely illustrative of the principles of the present invention, and numerous modifications and changes thereof will be apparent to those skilled in the art, without departing from the spirit and scope of the present invention, as set forth in the appended claims.

What is claimed is:

1. A wall plate adapted to be secured to an electrical apparatus disposed in a mounting surface and comprising a frame, an insert received by said frame, said insert defining a front wall having a front face and a back face at least one fastening-receiving aperture defined in said insert and at least one apparatus-receiving aperture defined in said insert, means cooperating with said fastening-receiving aperture for securing said insert to said electrical apparatus with said insert adapted to maintain said frame against the mounting surface when said insert is secured to said electrical apparatus, and means projecting from said back face of said insert and toward said electrical apparatus for preventing said insert from being damaged as said insert is secured to said electrical apparatus by acting as a stop preventing further movement of said insert toward said electrical apparatus under the influence of said securing means.

2. A wall plate adapted to be secured to an electrical apparatus disposed in a mounting surface according to claim 1 wherein said means cooperating with said fastening-receiving aperture for securing said insert to said electrical apparatus is a fastening element operatively connected at one end to said insert and operatively connected at the other end to said electrical apparatus and further wherein said damage-preventing means includes a first flange for abutting said electrical apparatus as said fastening element is tightened to said electrical apparatus.

3. A wall plate adapted to be secured to an electrical apparatus disposed in a mounting surface according to claim 2 wherein said first flange is disposed about said fastening-receiving aperture.

4. A wall plate adapted to be secured to an electrical apparatus disposed in a mounting surface according to claim 2 wherein said first flange further directs said fastening element toward said electrical apparatus.

5. A wall plate adapted to be secured to an electrical apparatus disposed in a mounting surface according to claim 2 wherein said frame includes an insert-receiving ledge for receiving said insert.

6. A wall plate adapted to be secured to an electrical apparatus disposed in a mounting surface according to claim 5 wherein said insert includes a ledge-receiving flange projecting away from said back face of said insert and toward said electrical apparatus, said ledge-receiving flange seated on said insert-receiving ledge such that said insert is maintained within said frame and said frame is maintained against the mounting surface when said insert is secured to said electrical apparatus.

7. A wall plate adapted to be secured to an electrical apparatus disposed in a mounting surface according to claim 6 wherein said insert further includes an apparatus receiving flange projecting away from said back face of said insert and toward said electrical apparatus, said apparatus receiving flange, said ledge-receiving flange and said first flange functioning to locate said insert relative to said electrical apparatus.

8. A wall plate adapted to be secured to an electrical apparatus disposed in a mounting surface and comprising a frame having a plurality of frame arms defining a frame opening, an insert-receiving ledge disposed on said frame arms and directed inwardly toward said frame opening, an insert having a front wall defining a front face and a back face, a first flange located about the periphery of said insert and directed away from said back face and toward said electrical apparatus, said first flange adapted to be seated on said insert-receiving ledge for maintaning said insert within said frame opening and for maintaining said frame against said mounting surface when said insert is secured to said electrical apparatus, at lease one fastening element for securing said insert to said electrical apparatus, said insert defining at least one aperture for receiving said fastening element, a second flange surrounding said aperture and projecting away from said back face and toward said electrical apparatus, said second flange extending further away from said back face than said first flange and adapted to abut said electrical apparatus for preventing damage to said insert as said fastening element is tightened and said insert is pulled toward said electrical apparatus.

9. A wall plate adapted to be secured to an electrical apparatus disposed in a mounting surface and comprising a frame having a plurality of frame arms defining a frame opening, an insert-receiving ledge disposed on said frame arms and directed inwardly toward said frame opening, an insert having a front wall defining a front face and a back face, a first flange located about the periphery of said insert and directed away from said back face and toward said electrical apparatus, said first flange adapted to be seated on said insert-receiving ledge for maintaning said insert within said frame opening and for maintaining said frame against said mounting surface when said insert is secured to said electrical apparatus, said insert defining at least one aperture adapted to receive a fastening element, a second flange surrounding said aperture and projecting away from said back face and toward said electrical apparatus, said second flange extending further away from said back face than said first flange and adapted to abut said electrical apparatus for preventing damage to said insert when said insert is secured to said electrical apparatus.

10. A wall plate adapted to be secured to an electrical apparatus disposed in a mounting surface according to claim 9 wherein said insert further defines at least one electrical apparatus receiving opening and a third flange surrounding said opening, wherein said first flange, said second flange and said third flange function to locate said insert relative to said electrical apparatus.

* * * * *